Figure 1:
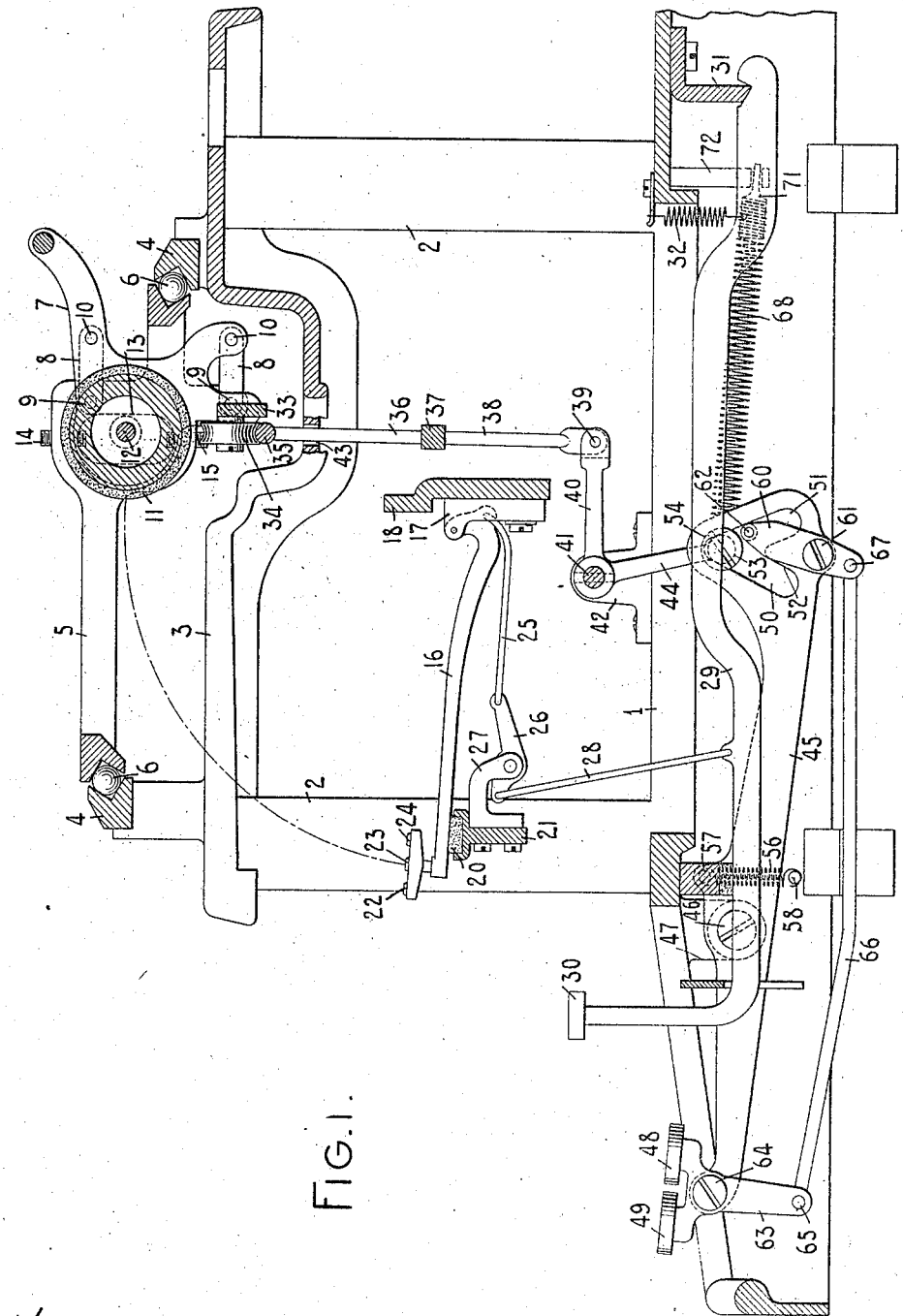

C. B. YAW.
TYPE WRITING MACHINE.
APPLICATION FILED NOV. 23, 1909.

963,974.

Patented July 12, 1910.
4 SHEETS—SHEET 1.

WITNESSES:
E. M. Wells
R. H. Strother.

INVENTOR:
Chris B. Yaw
By Jacob Felbel
HIS ATTORNEY

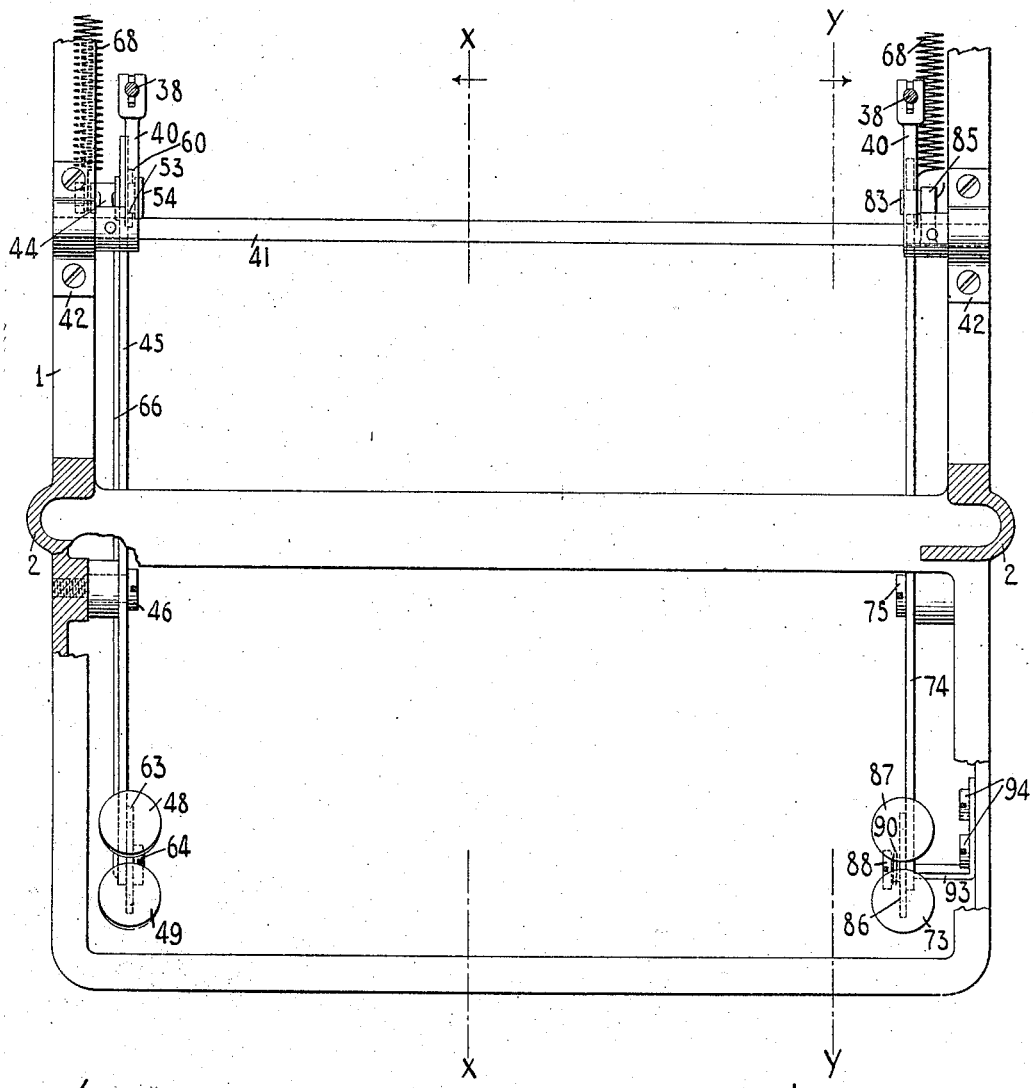

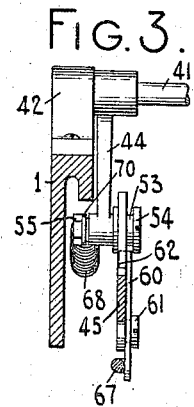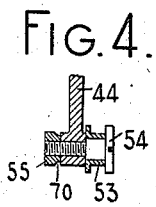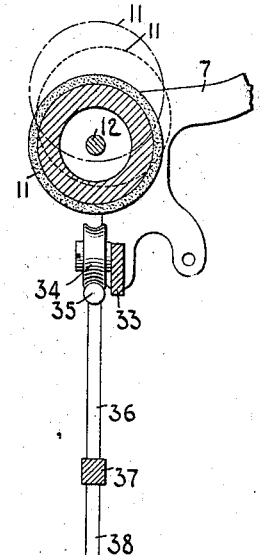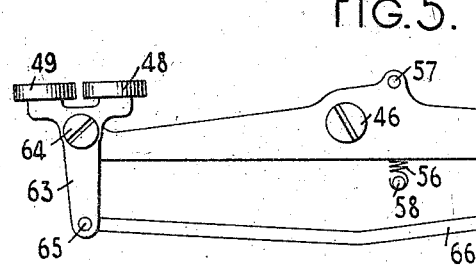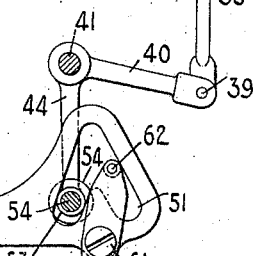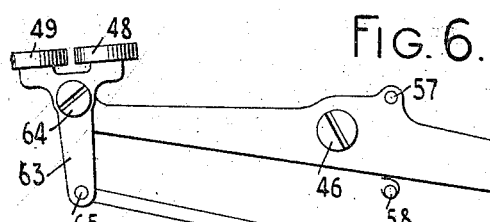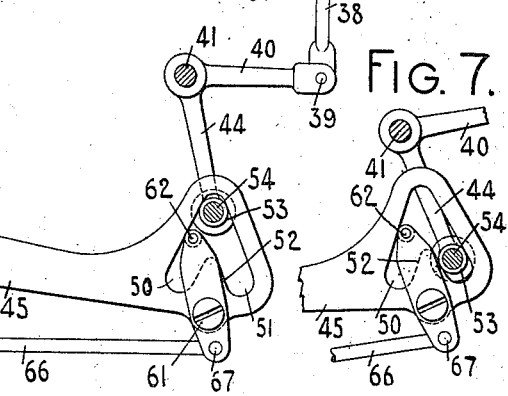

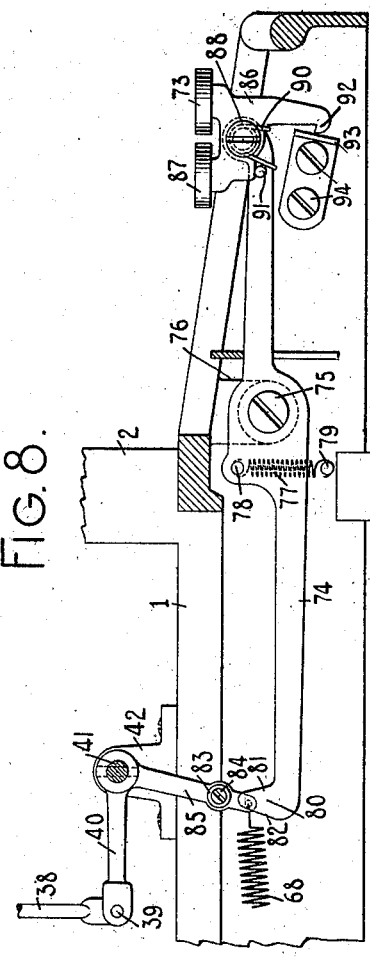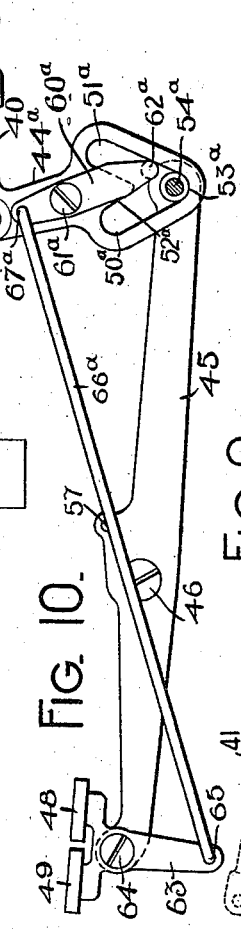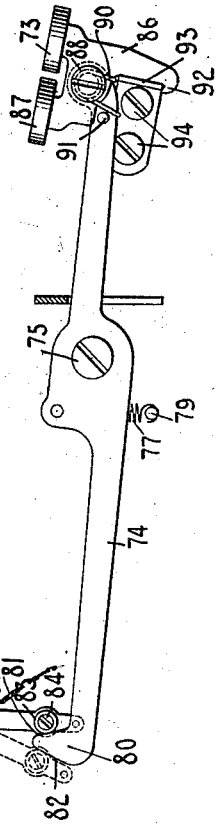

UNITED STATES PATENT OFFICE.

CLIO B. YAW, OF ARLINGTON, NEW JERSEY, ASSIGNOR TO REMINGTON TYPEWRITER COMPANY, OF ILION. NEW YORK, A CORPORATION OF NEW YORK.

TYPE-WRITING MACHINE.

963,974.  Specification of Letters Patent. Patented July 12, 1910.

Application filed November 23, 1909. Serial No. 529,579.

*To all whom it may concern:*

Be it known that I, CLIO B. YAW, citizen of the United States, and resident of Arlington, in the county of Hudson and State of New Jersey, have invented certain new and useful Improvements in Type-Writing Machines, of which the following is a specification.

My invention relates to typewriting machines and more especially to the case shift mechanism of such machines.

My invention has for one of its objects to produce a typewriter having an unusually large number of types.
Another object is to provide improved means for effecting a relative shift between the platen and the types to either one or three positions, and for holding the shiftable element in any one of said positions.
Another object is to provide simple, convenient and efficient mechanism for the purposes set forth.

My invention consists in certain features of construction and combinations and arrangements of parts, all of which will be fully set forth herein and particularly pointed out in the claims.

In the accompanying drawings, Figure 1 is a front to rear vertical sectional view of a typewriting machine on the line *x—x* of Fig. 2 and looking in the direction of the arrow at said line, said machine having my invention embodied therein, parts of the machine not necessary to an understanding of the present invention being omitted. Fig. 2 is a top plan view of the lower forward part of the typewriting machine, parts being sectioned or broken away and parts omitted. Fig. 3 is a fragmentary front view of a portion of the case shift mechanism, parts being shown in section and parts broken away. Fig. 4 is a fragmentary view in section showing a certain arm and a cam follower mounted thereon. Figs. 5, 6 and 7 are views similar to parts of Fig. 1 but showing the mechanism in different positions. Fig. 8 is a fragmentary vertical sectional view on the line *y—y* of Fig. 2 and looking in the direction of the arrow at said line. Fig. 9 is a similar view showing the parts in different positions. Fig. 10 is a partial side elevation of a modification.

My invention is applicable or adaptable to typewriting machines generally but I have here shown it applied to a front-strike machine. In some of these machines the printing instrumentalities are shifted up and down, the platen remaining at the same elevation and in other of such machines the platen is the shiftable element. My invention is equally applicable to either of these two classes of machines and it is here shown applied to the latter class; that is to say, to one in which the platen is shiftable up and down. I have in fact shown my invention applied to a machine of the sort known commercially as the Remington No. 10, but have modified said machine so as to put three types on each type bar instead of two and so as to provide for three shift positions of the platen. As ordinarily manufactured, this machine has forty-two type bars and, therefore, eighty-four types. The machine shown in the drawings is provided with one hundred and twenty-six types, which is a much larger number than typewriting machines are usually provided with. This has been accomplished without enlarging the external dimensions of the machine, in fact without modifying the usual dimensions of the machine in any respect except that the type bars are slightly longer and the platen shifts to a greater distance. Such a machine as is here shown is useful in any situation where a large number of characters are desired. One use that is contemplated for the machine is to equip it with enough characters to write in any one of two or three languages. Many of the letters are identical in the different languages and such letters do not have to be duplicated, but each language may have some letters not included in the other. The machine can, for example, be equipped to write in both Russian and Polish or in both Russian and English so that correspondence can be carried on in either language with the same machine. The mechanical features of my invention are, of course, applicable to machines having only the usual number of types.

The main frame of the machine shown in the drawings, comprises a base 1 from which rise corner posts 2 which support a top plate 3. On said top plate are mounted stationary carriage rails 4 which support a carriage truck 5 by means of anti-friction rollers or balls 6. Said truck carries a platen frame 7 which is connected with the truck by means of links 8, each pivoted at its forward end at 9 to the truck 5 and at its rear end at 10 to the platen frame 7. The roller platen 11 has a shaft 12 that is journaled in the platen frame 7 and the truck 5 has its end bars formed with vertical slots 13 through which the shaft 12 passes. Adjustable stop screws 14 and 15 are threaded through each of the end bars of the truck 5 and said screws project at their lower and upper ends respectively into the slots 13 in position to limit the up and down shifting motion of the shaft 12. In the ordinary Remington No. 10 machine this shaft normally rests on the lower screws 15 and is shifted for upper case writing upward against the upper screws 14. In the present case, however, these screws are spaced a greater distance apart and the shaft 12 normally occupies the middle position shown in Fig. 1 and it can be shifted either up against the screws 14 or down against the screws 15 as the case may be. I have not thought it necessary to illustrate nor to describe the carriage construction in minute detail as these parts do not differ from the well known previous construction except in the particulars pointed out.

The machine comprises a series of frontstrike type bars 16 mounted on hangers 17 which are secured to a type bar segment 18. The free ends of the type bars normally rest against a pad 20 mounted in a segmental support 21. The type bars are equipped with three types 22, 23 and 24. I have shown here only one type bar of the series but these type bars are of the same general form and are mounted in the same general way as in the well known Remington No. 10 construction except that the increased length of the type blocks makes it necessary to goose-neck some of the type bars near the ends of the segment in order to allow room for the type blocks. I have not thought it necessary to illustrate this construction because it does not form part of the present invention, this invention having to do with means for shifting the platen.

The type bars are operated by links 25 connected to sub-levers 26 mounted on hangers 27 secured to the segment 21 and said sub-levers are operated by links 28 connected at their lower ends to key levers 29 having printing keys 30 mounted on their forward ends and pivoted at their rear ends on a pivot bar 31 against which they are pressed by springs 32. The construction shown is that of the Remington No. 10 machine, although as far as the present invention is concerned any suitable type action may be provided and it is not necessary to the present invention that the type action comprise type bars at all as the invention is equally applicable to type wheel or segment machines.

The platen frame 7 comprises a cross bar 33 lying beneath the platen, and said cross bar has journaled thereon near the middle thereof a roller 34 having a concave face that rolls on a round shift rail 35 supported by posts 36 rising from a cross bar 37. Said cross bar has posts 38 depending therefrom and which at their lower ends are pivoted at 39 to arms 40 projecting horizontally toward the rear from a rock shaft 41 which extends across the machine, being journaled at its ends in brackets 42 secured to the base part 1 of the main frame of the machine. It will be understood that there is one of the arms 40 at or near each end of the shaft 41 so that the shift frame comprising the rail 35, cross bar 37 and posts 36 and 38, is supported at both ends. The posts 36 pass upward through an opening 43 in the top plate, which opening is of sufficient size in a front and back direction to allow a slight swinging motion to the shift frame about the pivots 39 as a center, this swinging motion being due to the fact that the pivots 10 at the rear ends of the links 8 do not move in straight lines but move in the arcs of circles and the roller 34 is therefore constrained to move in a similar path. The rock shaft 42 is controlled by an arm 44 depending therefrom, said arm being shown in the present instance at the left-hand end of the shaft. The arm 44 is controlled by a shift key lever 45 which is pivoted on a screw 46 threaded into a bracket 47 of the base 1 of the machine and having two shift keys 48 and 49 mounted on its forward end. The key lever 45 controls the arm 44 through a V-shaped or two-branched cam and follower. Obviously, either the cam or the follower can be on the arm 44 and the other of these parts on the key lever 45. As here shown the follower is on the arm 44 and the cam is on the key lever and this construction is preferred to the other. The rear end of the key lever 45 is formed with an inverted V-shaped slot having a downwardly and forwardly directed branch 50 and a downwardly and rearwardly directed branch 51, said branches being divided by a central lug or projection 52. The cam slot 50, 51 coöperates with a follower 53, the construction of which will be best understood by reference to Figs. 3 and 4. This follower consists of a flanged roller journaled on a shouldered and headed screw 54 threaded through the lower end of the arm 44 and having a lock nut 55 threaded on to its outer end. The head of the screw 54 is enlarged so as to give in connection with the flange of the roller 53 the effect of a grooved roller running in the slot 50, 51.

The lever 45 is normally held with its rear end depressed, as shown in Fig. 1, by means of a returning spring 56 secured at its upper end to a pin 57 projecting from the lever and at its lower end to a pin 58 projecting from the base 1 of the main frame. The tension of this spring forces the rear end of the lever downward, holding the follower roller in the V-shaped upper end of the cam slot where it is forced to occupy a middle position and thus hold the platen normally in the middle position shown in Fig. 1 where the middle type 23 of each type bar will be operative.

In order to guide the follower into one or the other of the branches 50, 51 of the slot when a shift key is operated, a switch 60 is provided, said switch, as here shown, consisting of a lever pivoted to the side of the lever 45 on a pivot screw 61. This lever is shiftable about its pivot to either of the two positions shown in Figs. 1 and 6. The motion of the switch about its pivot 61 is limited by a stop pin 62 riveted into the upper end of the switch lever and adapted to contact with the rear or front wall of the branched cam slot.

The two shift keys 48, 49, are mounted on the rear end forward branches respectively of a three-armed lever 63 which is pivoted on a pivot screw 64 threaded into the forward end of the lever 45, the key 48 being back of the pivot 64 and the key 49 being in front of said pivot. The lever 63 has a depending arm to which is pivoted at 65 the forward end of a link 66, the rear end of which is pivoted to the switch lever 60 at 67 below the pivot 61 of said lever.

If, when the parts are in the position shown in Fig. 1, the shift key 48 be depressed, the switch lever 60 will direct the follower 53 into the forward branch 50 of the cam slot and thus force the lever arm 44 forward and draw the platen down to its lowermost position as shown in full lines in Fig. 5. If, on the other hand, the key 49 be operated the first part of its depression will rock the lever 63 about its pivot and shift the link 66 toward the rear of the machine which will throw the shift lever to the position shown in Fig. 6. Further depression of the key 49 will operate the lever 45 and the switch 60 will direct the follower 53 into the rear branch 51 of the cam slot as indicated in Fig. 7. This will raise the platen to the uppermost one of its three positions. Upon the release of either of these keys the parts will be restored to normal position by the spring 56.

The weight of the shiftable parts is normally balanced by two springs 68, one of which at its forward end surrounds the lock nut 55 which is grooved out as shown in Fig. 4 at 70 for this purpose. The other spring is on the right-hand side of the machine and is connected to another arm depending from the shaft 41. The rear end of each of the springs 68 is secured to a screw threaded piece 71 which has a hole therethrough that fits loosely on a post 72 secured to the base 1 of the main frame. The coils of the spring lie between the threads of the piece 71 so that said piece can be loosened from the post 72 and screwed in or out as the case may be in order to regulate the tension of said spring. It is contemplated that these springs just about balance the weight of the parts carried by the arms 40 so that there will be substantially the same amount of work to do in shifting the platen either up or down and so that the spring 56 will not have the weight of the parts to work against in restoring them to and holding them in their normal middle position. It will be perceived that the platen occupies a middle position normally and that it is shifted in either direction by simply striking a depressible key.

In order to lock the platen in either of its shifted positions a key 73 is provided, said key being shown in the present instance as mounted on the right-hand side of the machine. The key 73 is mounted on the forward end of a key lever 74 which is pivoted between its ends on a pivot screw 75 threaded into a bracket 76 at the right-hand side of the base part 1 of the main frame. The key lever is held in its normal position by means of a spring 77 connected at its two ends to a pin 78 on the lever 74 and to a pin 79 on the main frame. The rear end of the lever 74 lies beneath the rock shaft 41 and said rear end is bent up, forming a nose or lug 80 having a forward inclined edge 81 and a rear inclined edge 82, said edges 81 and 82 converging upward. The lug 80 is adapted to coöperate with a roller 83 journaled on a pivot screw 84 threaded into the lower part of an arm 85 depending from and rigidly secured to the shaft 41. It is to the lower end of this arm 85 that the right-hand balancing spring 68 is connected. When either of the shift keys 48, 49 is depressed, the shaft 41 is rocked and the arm 85 is moved either forward of or back of its normal position as shown respectively in full lines and in broken lines in Fig. 9. When the parts are in either of these shifted positions the key 73 can be depressed and the lug 80 will be raised, bringing the edge 81 back of the roller 83 if the arm 85 has been swung forward and bringing the edge 82 in front of said roller if said arm has been swung backward. In either case the lug 80 will hold the arm 85 and with it all of the parts controlled by the shaft 41 including the platen in shifted position; that is to say, the lug is adapted to hold the platen either in its extreme upper position or in its extreme lower position.

In order to lock the lever 74 in its operated position shown in Fig. 9, the key 73 is not rigidly mounted on the lever 74 but is mounted on the forward arm of a three-armed lever 86, a release key 87 being mounted on the rear arm of said lever. The lever 86 is pivoted on a pivot screw 88 passing through said lever and threaded into the lever 74. The screw 88 has a shouldered part around which is coiled a spring 90 bearing at one end against the lever 86 and at the other end against the lever 74, the tension of this spring being exerted to elevate the key 73 and to depress the key 87 about the pivot 88. The motion of the lever 86 under the impulse of the spring 90, is limited by a pin 91 projecting from the lever 74. The lever 86 has a third, depending arm, the lower end of which is formed into a hook 92 that is adapted to engage under a bracket 93 which is secured to the base 1 of the main frame by screws 94.

When it is desired to shift the platen in either direction and to lock it in shifted position, the appropriate one of the shift keys 48, 49 is depressed to shift the platen and the key 73 is then struck, which depresses the lever 74, the hook 92 moving downward in rubbing contact with the forward face of the bracket 93. When said hook reaches the bottom of the bracket the pressure of the finger on the key 73 rocks the lever 86 about its pivot 88 and forces the hook 92 into locking engagement under the lower edge of the bracket 93, where said hook is retained by friction. When it is desired to release the platen from its shifted position this is done by striking the key 87 which rocks the lever 86 and releases the hook from the bracket 93. The lever 74 is returned to normal position by its spring 77 and the platen is returned to its normal middle position by the spring 56. It will be perceived that each act of locking the platen in shifted position and of releasing it from shifted position, is performed by a downward pressure on a depressible key.

Both the shift key lever 45 and the locking key lever 74 are off at the sides of the machine where they do not interfere with any of the other mechanism and all four of the keys 48, 49, 73 and 87 are at the sides of the key-board in situations where they do not interfere with the other keys but where they are included in the general key-board arrangement of the machine.

In the modification shown in Fig. 10, the roller is mounted on the rear end of the key lever and the V-shaped cam and the switch are mounted on the shaft 41, the cam being formed in a plate-like arm of said shaft. In this figure, parts which are identical with those shown in other views, are designated by the same reference characters and parts which correspond with the parts in the other views but which have been modified either in form or position, are designated by the same reference numerals but with the exponent "a." It will be seen that this form of the invention operates in the same way as the one previously described with the exception that whereas in Fig. 1 an operation of the key 48 moves the platen frame downward from normal position and an operation of the key 49 moves it upward, the reverse is true in this figure; that is to say, the key 48 causes the platen to be moved upward and the key 49 downward.

Various other changes can be made in the details of construction and arrangement without departing from my invention.

What I claim as new and desire to secure by Letters Patent, is:—

1. In a typewriting machine, the combination of a platen, printing instrumentalities including a series of types, and means for effecting a relative case shift motion between said printing instrumentalities and said platen to any one of three relative positions, said shifting means comprising as parts thereof a follower and a V-shaped cam, one of said parts being connected with the shiftable element, two shift keys operatively connected with the other of said parts, and a switch operated by said keys and operating to direct said follower to one or the other of the branches of said cam according to which of said keys is operated.

2. In a typewriting machine, the combination of a platen, printing instrumentalities including a series of types, and means for effecting a relative case shift motion between said printing instrumentalities and said platen to any one of three relative positions, said shifting means comprising as parts thereof a follower and a V-shaped cam, one of said parts being connected with the shiftable element, two shift keys operatively connected with the other of said parts, and a switch operated by said keys and operating to direct said follower to one or the other of the branches of said cam according to which of said keys is operated, and a spring for normally holding said follower in the angle of said V-shaped cam whereby said shiftable element is normally held in a middle position.

3. In a typewriting machine, the combination of a platen, printing instrumentalities including a series of types, and means for effecting a relative case shift motion between said printing instrumentalities and said platen to any one of three relative positions, said shifting means comprising as parts thereof a follower and a V-shaped cam, one of said parts being connected with the shiftable element, a key lever controlling the other of said parts, two keys for operating said key lever, and a switch controlled by said keys and operating to direct said follower to one or the other of the branches of said cam according to which of said keys is operated.

4. In a typewriting machine, the combination of a key lever having a V-shaped cam, a follower for said cam, two keys for operating said key lever, a switch movably mounted on said key lever and controlled by said keys and operating to direct said follower to one or the other of the branches of said cam according to which of said keys is operated.

5. In a typewriting machine, the combination of a key lever having a V-shaped cam, a follower for said cam, two keys for operating said key lever, a switch movably mounted on said key lever and controlled by said keys and operating to direct said follower to one or the other of the branches of said cam according to which of said keys is operated, and a spring acting on said key lever and normally holding said follower in a middle position in the angle of said cam.

6. In a typewriting machine, the combination of a key lever having a V-shaped cam, a follower for said cam, a second lever pivoted on said key lever and having two keys thereon, and a switch movably mounted on said key lever and controlled by said second lever and operating to direct said follower to one or the other of the branches of said cam according to which of said keys is operated.

7. In a typewriting machine, the combination of a key lever having a V-shaped cam, a follower for said cam, a three-armed lever pivoted on said key lever, two keys mounted on two of the arms of said three-armed lever, a link connected to the third arm of said lever, and a switch operated by said link and operating to direct said follower into one or the other of the branches of said cam.

8. In a typewriting machine and in case shift mechanism, the combination of a part to be shifted from normal position to either of two shifted positions, a single key lever having a double cam, and means for switching said part to be shifted under the control of one or the other of the parts of said cam when the key lever is operated.

9. In a typewriting machine, the combination of a shiftable platen frame, a shift rail on which said platen frame moves across the machine, a rock shaft having two arms, means whereby said arms support said shift rail, an arm depending from said rock shaft and having a follower on the lower end thereof, a V-shaped cam controlling said follower and normally holding it in a middle position, a switch for directing said follower into one or the other of the branches of said cam, and shift keys for controlling said switch and cam.

10. In a typewriting machine, the combination with a platen and printing instrumentalities including a series of types, case shift mechanism for effecting a relative shifting movement between said platen and said printing instrumentalities to any one of three positions, said case shift mechanism including a transverse rock shaft, cam and follower devices for operating on one end of said rock shaft, a shift key mechanism controlling said cam and follower devices, a lock acting on the other end of said shaft and adapted to hold said shaft in either of its shifted positions, and a key controlling said lock.

11. In a typewriting machine and in case shift mechanism, the combination with a platen and printing instrumentalities including a series of types, of means for effecting a relative shifting movement between said platen and printing instrumentalities, said shifting means including means for holding the shiftable element in a normal middle position, and means for moving said shiftable element in either direction from said middle position, and a lock including a key lever having a nose or lug projecting therefrom and adapted to be moved into locking engagement with a part connected with said shiftable element, said nose or lug being arranged to move on the one side of said part if said element is shifted in one direction and on the other side of said part if the element is shifted in the other direction, and means for locking said key lever in operated position.

12. In a typewriting machine and in case shift mechanism, the combination with a platen and printing instrumentalities including a series of types, shifting mechanism for imparting a relative case shift motion to said platen and printing instrumentalities, said shifting mechanism including means for normally holding the shiftable element in middle position and means for shifting said shiftable element in either direction from said middle position, and a lock for locking said shiftable element in either of its shifted positions, said lock including a part that moves with said shiftable element, a nose adapted to be projected into engagement with said part, said nose passing on one side of said part if said shiftable element is shifted in one direction and on the other side of said part if the shiftable element is shifted in the other direction, a key connected with said nose, and means for locking said nose in operated position.

13. In a typewriting machine and in case shift mechanism, the combination with a platen and printing instrumentalities including a series of types, said platen and printing instrumentalities being relatively shiftable to either one of three positions, of shifting mechanism including a transverse rock shaft controlling the shiftable element, an arm at one end of said rock shaft, means for normally holding said arm in a middle position, and means for shifting said arm in either direction from said middle position; and means for locking the shiftable element in either of its shifted positions, said locking means including an arm at the other end of said rock shaft, a key lever having a nose adapted to engage said arm to hold it in either of its shifted positions, and means for locking said key lever in operated position.

14. In a typewriting machine, the combination of a part to be shifted, means for normally holding said part in a middle position and means for shifting said part in either direction from said middle position, said shifting means including a follower, a pivoted switch, means for swinging said switch about its pivot to bring it into position to operate said follower in one direction or the other, and means for moving said switch to operate said follower.

15. In a typewriting machine, the combination of a part to be shifted, means for normally holding said part in a middle position and means for shifting said part in either direction from said middle position, said shifting means including a follower, a pivoted switch, two keys, means operated by said keys for swinging said switch about its pivot to bring it into position to operate said follower in one direction or the other according to which key is operated, and means operated by either of said keys for moving said switch to operate said follower.

16. In a typewriting machine and in case shift mechanism, the combination with printing instrumentalities and a platen, one of which elements is shiftable relatively to the other to any one of three positions, of means for holding the shiftable element in one of said positions, two depressible shift keys, means operative by a depression of one of said keys for shifting said shiftable element to one position, and operative by a depression of the other of said keys for shifting said element to the other of said positions, a depressible shift-lock key, means operative by a depression of said shift-lock key to lock said shiftable element in either of its shifted positions, and a depressible release key operative by a depression thereof to release said locking means.

Signed at the borough of Manhattan, city of New York, in the county of New York, and State of New York this 22nd day of November, A. D. 1909.

CLIO B. YAW.

Witnesses:
CHARLES E. SMITH,
E. M. WELLS.